Figure 1:
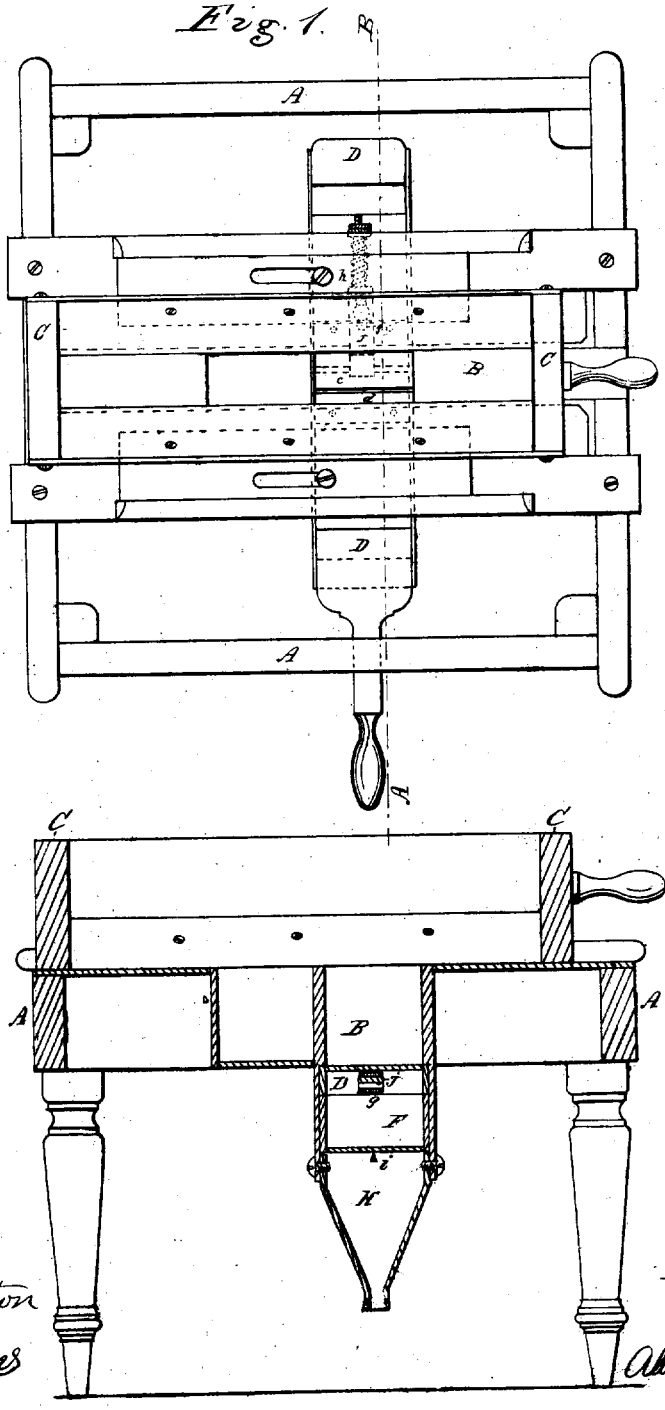

BEST AVAILABLE COPY

A. KNOWLTON.

Machines for Arranging Nails.

No. 5,313. Reissued March 4, 1873.

Witnesses
James Knowlton
Samuel Crows

Inventor
Albion Knowlton

AM. PHOTO-LITHOGRAPHIC CO. N.Y. (OSBORNE'S PROCESS.)

2 Sheets--Sheet 2.

A. KNOWLTON.

Machines for Arranging Nails.

No. 5,313. Reissued March 4, 1873.

Witnesses
James Knowlton
Samuel Snow

Inventor
Albion Knowlton

AM. PHOTO-LITHOGRAPHIC CO. N.Y. (OSBORNE'S PROCESS)

UNITED STATES PATENT OFFICE.

ALBION KNOWLTON, OF BOSTON, MASSACHUSETTS, ASSIGNOR TO JOHN HILL, TRUSTEE OF THE McKAY HEELING-MACHINE ASSOCIATION.

IMPROVEMENT IN MACHINES FOR ARRANGING NAILS.

Specification forming part of Letters Patent No. 118,250, dated August 22, 1871; reissue No. 5,313, dated March 4, 1873.

*To all whom it may concern:*

Be it known that I, ALBION KNOWLTON, of Boston, in the county of Suffolk and State of Massachusetts, have invented an Improvement in Machines for Distributing Nails, and I do hereby declare that the following is a full, clear and exact description thereof, which will enable others skilled in the art to make and use the same, reference being had to the accompanying drawings forming part of this specification:

The invention relates to an organization of mechanism designed for selecting from a loose assemblage of nails individual nails, and delivering or presenting them one by one, head first, to any mechanism connected with the delivery-orifice of the machine, the object of the invention being to provide a means for the automatic selection and presentation of nails or blanks, in proper form or position for the action of any kind of nailing-machines or of machines operating upon nails or nail-blanks, or for the arrangement of nails, nail-blanks, or similar devices of regular or uniform shape, in or for bundles or packages in which it is necessary or desirable that the nails or other devices should be arranged in piles, with all of their heads together.

One use for which the organization is particularly applicable is to supply the heels of boots and shoes with nails to be driven by machine, such heels being generally punched for reception of the nails, and with heeling-machines now in use, the nails being supplied by hand; whereas with my machine, and with the aid of suitable adjunctive conveying mechanism, the punched holes of the heels may be automatically, and in succession, charged with nails without hand labor.

In my invention I use a vertical rectangular chamber, in length about equal to the length of the nails, (being a little in excess of the nail length, to allow the nails to drop freely through it,) and of any desirable width to permit several nails to lie side by side upon the plate that forms the bottom of the box, this plate being made as a slide with a slit or vertical pocket opening through it of a width and length just sufficient to receive a nail, each forward movement of the slide bringing this pocket over another vertical pocket of similar form so that the bottom nail of the single vertical pile of nails in the slide-pocket drops down through it into and through the lower pocket, the nail next above the lower one being detained so that only the lower nail, or one nail at a time, can drop, the back movement of the slide releasing the detained nail so that it, with those above it, can drop, the slide arresting their movement. It is in this construction that the invention primarily consists, or in an organization by which nails arranged in a pile in a box corresponding in length to them drop from said pile into a vertical pocket or chute equal in length and width to the nail, and having a depth to receive several nails, from which pocket or chute nails drop intermittently, one by one, into another vertical pocket or chute leading to the delivery spout or conductor, a suitable detaining mechanism holding all the nails but the lower one, when the two pockets or conductors are brought into connection, so that the bottom one and that alone can drop. In connection with the said mechanism that delivers the nails singly or one by one, I use a knife-edge pivot placed at the center of the conductor, upon which pivot the nail falls from the slide pocket, the nail tipping upon the pivot and the head or heavier end of the nail dropping down, so that, as the conductor narrows just below the pivot and terminates in a spout and the nail cannot turn after entering the conductor, each nail is delivered head downward.

Figure 2:
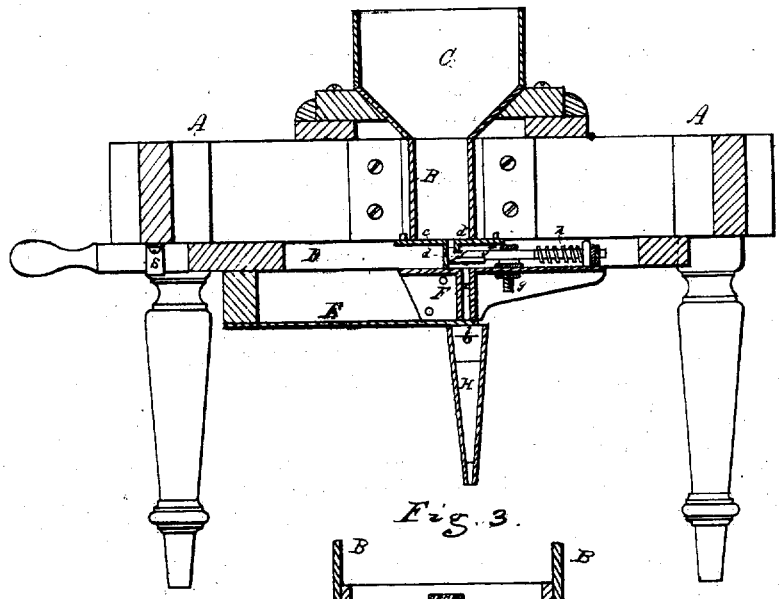
Figure 3:
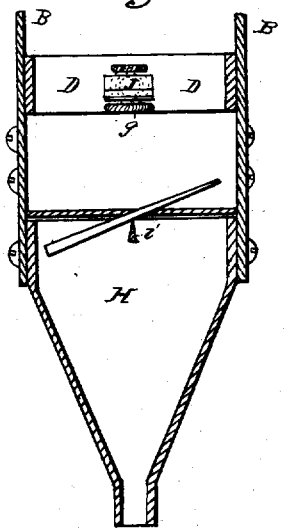

In the accompanying drawing, Figure 1 represents a plan of the machine. Fig. 2 represents a section through the line A B, as shown in Fig. 1. Fig. 3 represents a section of the conductor, showing the manner in which the nail is turned.

My machine may be divided, for the purposes of description, into two parts: First, the hoppers for holding and arranging the nails parallel to each other; second, the mechanism for singling out and distributing the nails so that they shall be delivered with the head directed downward.

A represents a frame-work upon which a rectangular box, B, of brass or other metal is fitted. This box is about one inch in width, two inches in depth, and varies in length according to the number of nails to be distributed at the same time. This box is divided vertically into compartments or hoppers, each a little longer than the nails to be used. These hoppers or reservoirs are open at the top, the bottom being closed in a manner hereafter to be described. C represents a hopper placed over the hoppers B. This hopper, the transverse section of which is somewhat in the shape of a U, is open at the bottom, and extends the whole length of the line of hoppers, the bottom being a little narrower than the width of the hoppers B. This hopper has a reciprocal movement in the same direction as the longest axis of the hoppers B, and is actuated by a cam or other well-known mechanical contrivance. D denotes a movable frame, the upper surface of which carries a plate forming the bottom of the reservoirs B, and furnished with a groove or pocket, while the lower surface is formed of a plate placed at the distance of half an inch or more below the upper plate, and extending a little beyond the perforation or pocket in the upper plate. F is a stationary plate placed between the upper and lower surfaces of the movable frame, supporting a plunger operated by a spring, the purpose of which is to prevent more than one nail at a time from passing from the machine. This plate is also furnished with a perforation or pocket, the walls of which extend the distance between the bottom of the pocket or perforation of the upper plate of the movable frame and the upper surface of the bottom plate of the same. H is a conductor in the form of a flattened cone placed under the stationary perforation or pocket, and bisected at the upper part by a thin edge of metal for the purpose of turning the nail and directing it head downward. The movable frame forming the bottom of the hopper is shown at D. This has a reciprocal movement of about one-half of an inch (more or less) under the hoppers, and at right angles with them. In the accompanying drawing the frame is adapted to only one of the hoppers. This frame is secured to the frame-work of the table at *s*, and slides between hangers. *e* represents the portion of the frame D forming the bottom of the hopper or reservoir; *d*, the perforation or pocket bisecting it, which is a little wider than the head of the nail to be used, and the same length as the hopper. The walls of this perforation extend a short distance below the upper surface of the frame D. One of these walls has a portion of it removed, as represented in *d'*. E represents the bottom of the frame D; F, the stationary plate placed between the upper and lower movable plates, and secured to the reservoir or hopper by hangers. *x* represents the perforation or pocket of the plate F; J, the plunger, operated by the spring *h*, and attached to the plate F by the screw *g*. This plunger, the point of which is of iron or steel, beveled, plays through the pocket *d* at *d'*, at a distance above the surface of the plate F a little greater than the width of the head of the nail to be used. H represents the conductor, and *i* the thin edge of metal bisecting this conductor. The length of the mouth of this conductor is the same as the length of the slot *x*, and of any convenient width. The walls of the conductor converge toward a point below the bottom, but leave space between them to easily admit the passage of a nail, the orifice being about one quarter of an inch square.

The mode of operation is as follows: The reservoirs or hoppers are first filled with nails laid parallel to each other, and a pound or more of nails are thrown loosely into the large hopper C. A few of the nails fall into the slot *d*, one above the other, the bottom nail resting on the stationary plate F. The machine is then put in motion. As the frame D moves inward the pocket *d* is brought directly over the pocket *x* of the stationary plate F, while the lower plate E of the movable frame is brought directly under the pocket *x*, and the nail resting on the stationary plate F falls into the pocket *x* upon the plate E. As the pocket *d* moves over the pocket *x* the plunger J passes into the pocket *d*, pressing against the second nail from the stationary plate so as to allow the bottom nail only to pass into the pocket *x*. The movable frame then moves in the opposite direction, carrying the pocket *d* away from the plunger so that this is no longer pressed against the nails contained in the pocket or the walls of the same, and another nail falls upon the plate F. The plate E is withdrawn, and the nail resting upon this plate drops into the conductor H, falling with its center across the edge of metal *i*. The head, by its gravity, is directed downward, and in this position it passes from the conductor. The frame is then moved inward, and the operation repeated, as above described, a nail with the head downward passing from the machine at every completed movement of the frame. The large hopper C, containing the nails loosely thrown into it, is during these operations moved forward and backward above the hoppers, the motion and the shape of the hopper straightening the nails and keeping the hopper supplied with nails laid parallel to each other.

It is obvious that the position of each nail as it leaves the machine being determined, its subsequent position may be changed, as convenience may require. The reciprocal movement given to the hopper C and to the frame D may be produced by a shaft, cam, or other well-known mechanical contrivance.

This machine may also be constructed with any number of hoppers and distributing apparatus, though for all practical purposes one would be sufficient, the distribution being at the rate of about two per second. The size of the hoppers, slots, and conductors will also vary according to the size of the nail to be used.

This machine may also be applied to the sorting and distribution of needles preparatory to putting them into wrappers, whereby a great saving of time and labor may be effected.

This apparatus may also be used for sorting, distributing, and feeding into a roller horseshoe-nails after they have been punched out and when in the first stage of manufacture, the ends of the slots being enlarged so as to admit the passage of the head of the nail.

The position of the narrow edge of metal *i* may be varied, as convenience may require, being placed either in the conductor H or in the slot *x*, at any point at a distance of one-half the length of the nail to be used below the plate F, although I have found the position as described meets all the requirements of the machine. The edge *i* may also be placed longitudinally across the conductor when it is desired that the heavier side of the nail should be conducted downward, as in the case of a horseshoe-nail when partly formed.

I claim—

1. In combination with the vertical nail-chamber B, the sliding nail pocket or passage *d*, plunger J, and the nail-conducting chute *x*, so arranged that by relative sliding movement the nails pass singly from the chamber to the pocket, and from the pocket to the conductor, substantially as described.

2. The combination of the vertical nail-chamber B, nail-pocket *d*, plunger J, nail-pocket *x*, plate E, and chute or conductor H, the chamber B, pocket *x*, and chute H being stationary, and the pocket *d* and plate E movable, the whole operating to select and deliver one by one the nails, substantially as described.

3. The combination, with the pin *i*, of the stationary plate F and its pocket *x*, and the movable plate E and pocket *d*, substantially as shown and described.

4. The combination of the nail-chamber, the reciprocating frame D having the pocket *d*, and the reciprocating chamber-charging hopper C, operating to keep the chamber supplied with nails, substantially as described.

ALBION KNOWLTON.

Witnesses:

FRANCIS GOULD,

M. W. FROTHINGHAM.